US007876723B2

(12) United States Patent
Lv et al.

(10) Patent No.: US 7,876,723 B2
(45) Date of Patent: Jan. 25, 2011

(54) SYSTEM AND METHOD FOR UPDATING UATI OF AN ACCESS TERMINAL

(75) Inventors: Sha Lv, Guangdong (CN); Shunlin Chen, Guangdong (CN); Youli Song, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 943 days.

(21) Appl. No.: 11/740,674

(22) Filed: Apr. 26, 2007

(65) Prior Publication Data
US 2008/0267115 A1 Oct. 30, 2008

(51) Int. Cl.
*H04W 4/00* (2009.01)
(52) U.S. Cl. .................. 370/328; 455/435.1; 455/458
(58) Field of Classification Search ........... 370/328
See application file for complete search history.

(56) References Cited

U.S. PATENT DOCUMENTS

| 7,103,662 B2 * | 9/2006 | Ray et al. ............ 709/225 |
| 2007/0197220 A1 * | 8/2007 | Willey ............ 455/435.1 |

FOREIGN PATENT DOCUMENTS

| CN | 1773950 A | 5/2004 |
| KR | 10-0425078 | 3/2004 |
| WO | 2006/110021 A1 | 10/2006 |

OTHER PUBLICATIONS

3GPP2, "Interoperability Specification (IOS) for High Packet Data (HRPD) Radio Access Network Interfaces with Session Control in the Packet Control Function", Mar. 2006, 3rd Generation Partnership Project "3GPP2", 3GPP2 A. S0009-A V1.0.
Written Opinion of the International Searching Authority issued in corresponding International Application No. PCT/CN2007/001391; mailed Feb. 14, 2008.
International Search Report issued in corresponding PCT Application No. PCT/CN2007/001391; mailed Feb. 14, 2008 (including published application).
Statement from Applicant regarding Prior Art Submission.

* cited by examiner

*Primary Examiner*—Charles N Appiah
*Assistant Examiner*—Natasha Cosme
(74) *Attorney, Agent, or Firm*—Brinks Hofer Gilson & Lione

(57) ABSTRACT

A system for communication of an access terminal in a wireless network having a plurality of subnets. The system determines, based upon movement of the access terminal in a dormant state between subnets, and upon ColorCode and SecondaryColorCode values of each subnet, whether or not the access terminal should immediately initiate a Unicast Access Terminal Identifier (UATI) update request, or delay the Unicast Access Terminal Identifier (UATI) update.

18 Claims, 4 Drawing Sheets

SYSTEM AND METHOD FOR UPDATING UATI OF AN ACCESS TERMINAL

TECHNICAL FIELD OF THE INVENTION

The present invention relates generally to wireless communications, and more particularly, to a versatile system and method for updating Unicast Access Terminal Identifier (UATI) for an Access Terminal in a dormant state.

BACKGROUND OF THE INVENTION

Under the High Rate Packet Data (HRPD) standard defined by the $3^{rd}$ Generation Partner Project 2 (3GPP2), when an Access Terminal (AT) moves from one subnet into another subnet in a dormant state, the AT is required to initiate a Unicast Access Terminal Identifier (UATI) request—updating the UATI of the AT and routing-related information of its corresponding user. To reduce UATI requests resulting from frequent moves between subnets of the AT in a dormant state, the HRPD 3.0 protocol in 3GPP2 provides a function of SecondaryColorCode. When a dormant AT moves from a source subnet to a target subnet, if ColorCode stored by the AT matches the SecondaryColorCode of the target subnet, then the AT does not initiate a UATI request. The AT in the target subnet is in an idle state.

Therefore, as a dormant AT moves into a target subnet, if the AT does not establish a connection with the target subnet after comparing the stored ColorCode in the AT with SecondaryColorCode of the target subnet, then neither the source subnet nor the target subnet may directly know the AT's location.

Under the current HRPD standard, if a dormant AT does not establish connection with a target subnet, the AT may be connected with the target subnet through communications between subnets, and a source subnet may call the AT by paging across subnets.

FIG. 1 illustrates a diagram of signaling between HRPD subnets. AT (100) establishes a session in a source subnet (102), and saves the session information. In a SectorParameters message of Source Subnet (102), ColorCode is 7. Target Subnet (104) has a SecondaryColorCode of 7. Therefore, when AT (100) moves to Target Subnet (104) in a dormant state, AT (100) does not initiate a UATI request, because the ColorCode stored by AT (100) matches the SecondaryColorCode of Target Subnet (104).

When Source Subnet (102) needs to page AT (100), paging will first be done within Source Subnet (102). If paging within Source Subnet (102) fails, Source Subnet (102) will find AT (100) in Target Subnet (104) through communications between Source Subnet (102) and Target Subnet (104).

Since Target Subnet (104) does not have session information of AT (100), if AT (100) needs to establish a connection with Target Subnet (104), Target Subnet (104) may obtain session information of AT (100) in Source Subnet (102) through subnet communications, and establish the connection.

Thus, by utilizing the SecondaryColorCode feature, an AT moving around in a dormant state from one subnet to another subnet may not update UATI, and signaling between an Access Network (AN) and the AT may be transmitted through subnet communications.

When a call from a source subnet needs to be connected to an AT, since the AT has moved to a target subnet, paging the AT within the source subnet will not succeed. Then, paging may be made between the source subnet and the target subnet to get to the AT. An unsuccessful paging within the source subnet, and paging across the subnets obviously bring forth greater paging delay, or even missing pages, resulting in poor call connection performance.

When the AT in the target subnet initiates a call request, the target subnet will have to retrieve session information associated with the AT from the source subnet, since the target subnet does not have such information. After the session information is transferred to the target subnet, the call set-up may proceed, and A8, A10 and UATI information is updated. This delays call set-up for the AT, and results in poor call connection performance.

Therefore, there is the need for an effective method of signaling when an AT moves around within two or more subnets, particularly while in a dormant state.

SUMMARY OF THE INVENTION

A system for communication of an access terminal, in a wireless network having a plurality of subnets, is provided. The system determines, based upon movement of the access terminal in a dormant state between subnets, and upon ColorCode and SecondaryColorCode values of each subnet, whether or not the access terminal should immediately initiate a Unicast Access Terminal Identifier (UATI) update request, or delay the Unicast Access Terminal Identifier (UATI) update.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Figure 1:
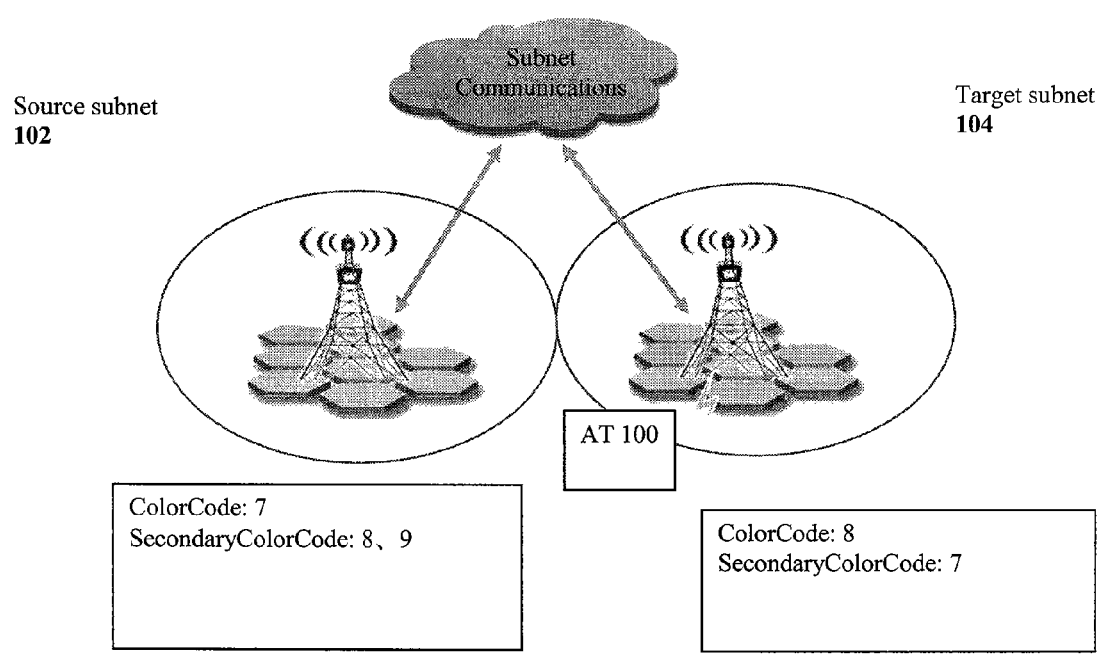
FIG. 1 is a diagram illustrating a PRIOR ART communication system.
Figure 2:
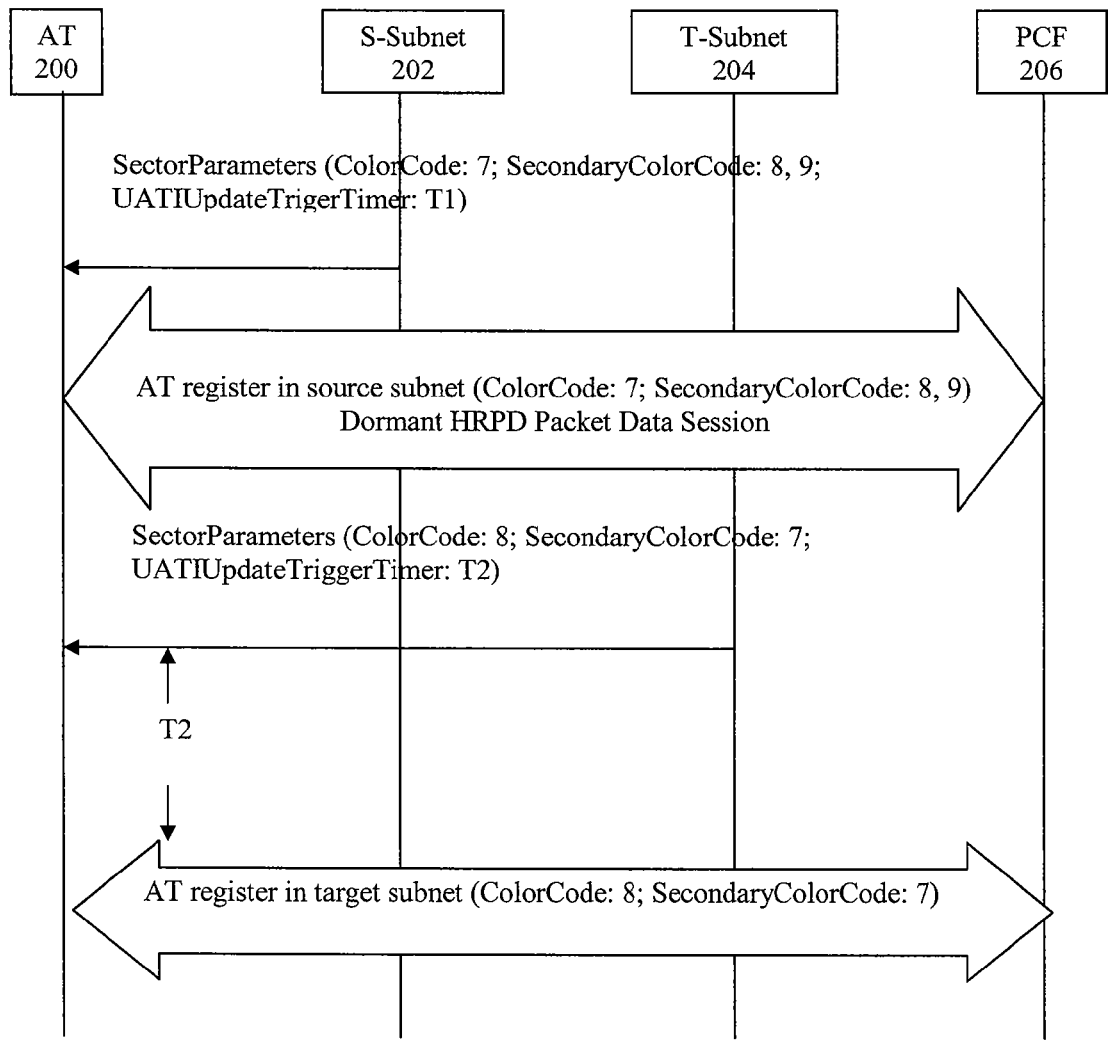
FIG. 2 is a flow diagram illustrating one embodiment of the present invention.
Figure 3:
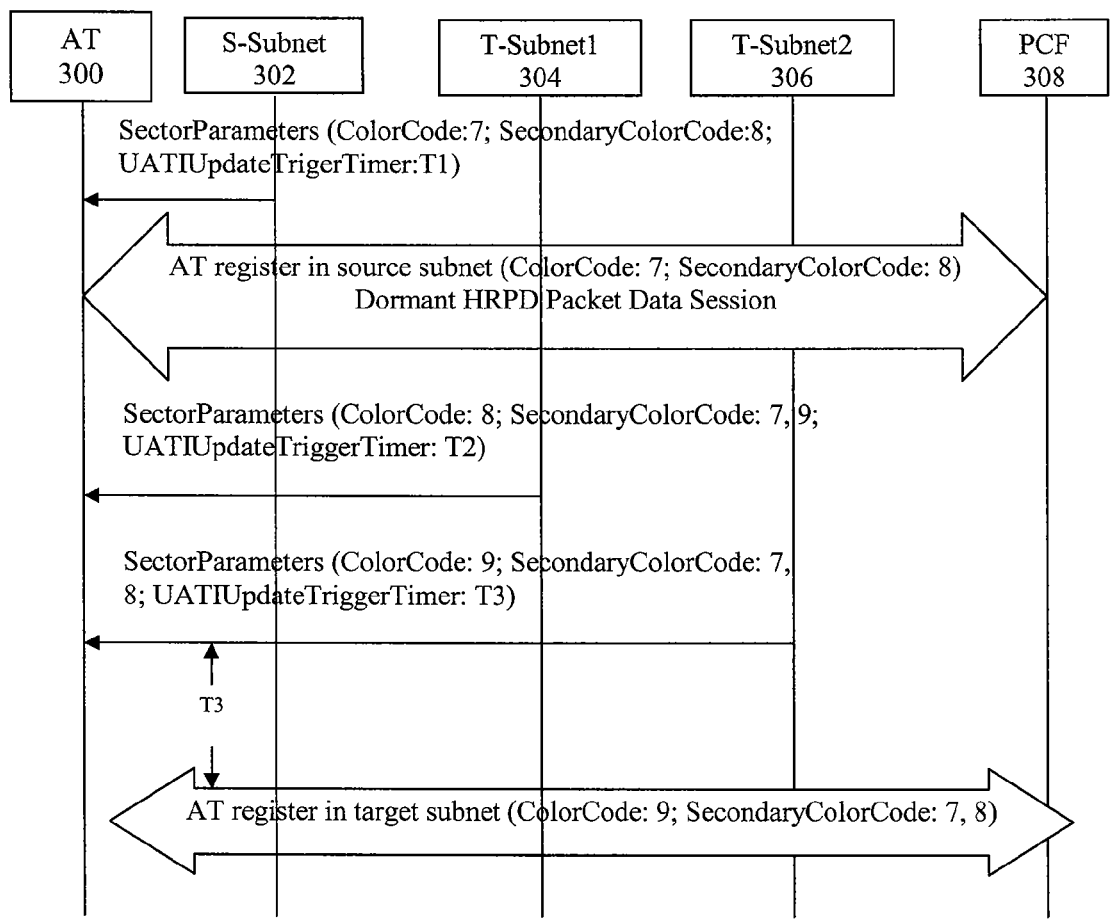
FIG. 3 is a flow diagram illustrating yet another embodiment of the present invention.
Figure 4:
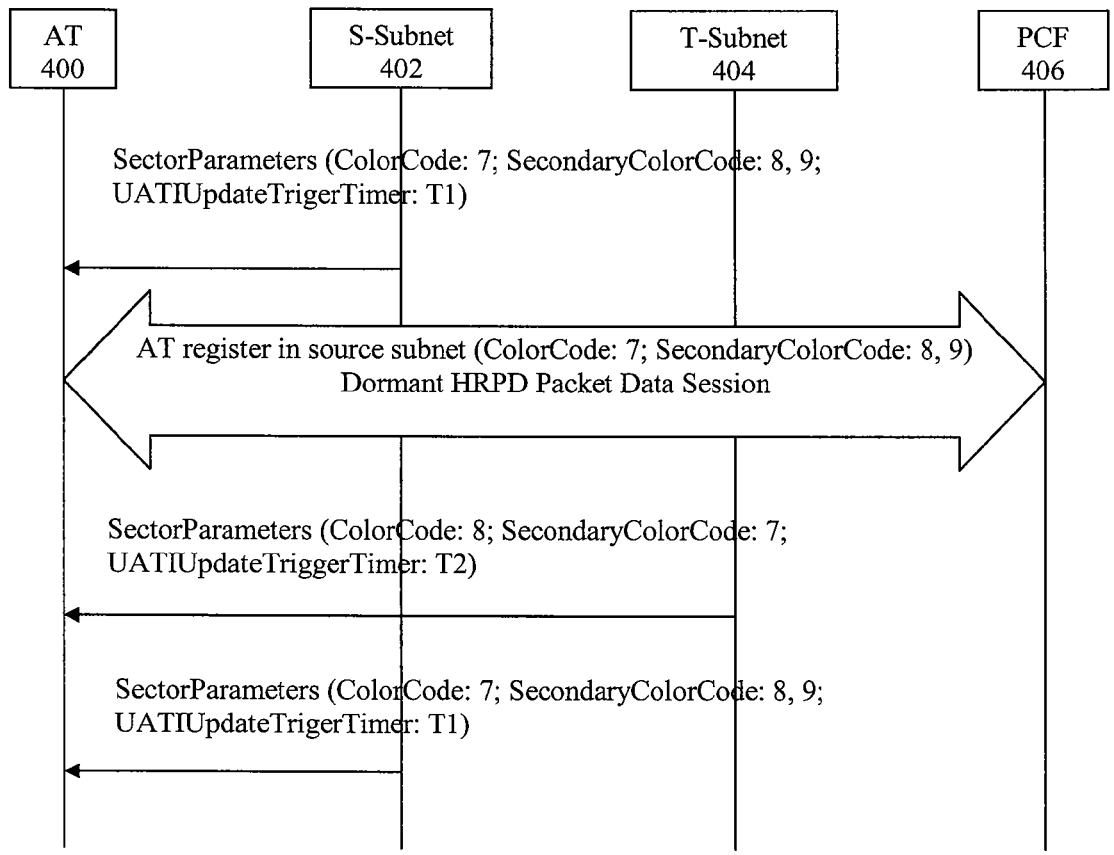
FIG. 4 is a flow diagram illustrating yet another embodiment of the present invention.

The embodiments of the present invention are described now in reference to FIGS. 2-4, and in comparison and reference to certain aspects of the PRIOR ART system of FIG. 1.

When an Access Terminal (AT) (100), in a dormant state, moves to a Target Subnet (104) from a Source Subnet (102)—and if AT (100) determines, that ColorCode of AT (100) already stored matches the SecondaryColorCode of Target Subnet (104), i.e., no Unicast Access Terminal Identifier (UATI) update is required in Target Subnet (104)—AT (100)

may delay the UATI update in Target Subnet (104), instead of not initiating the UATI update.

There may be various ways to delay the UATI update. One embodiment for AT (100) to delay UATI update may be that AT (100) may initiate a UATI update timer. An UATI update request may then be initiated by AT (100) in Target Subnet (104) if the UATI update timer expires. The length of the UATI update timer may be defined in various ways, without departing the scope and spirit of the present invention. For example, the value of the UATI update timer may be defined by target subnet (104) which the AT moves in, and sent to AT (100). One embodiment may define the length of the UATI update timer by a value of UATIUpdateTriggerTimer in a SectorParameters message sent by Target Subnet (104). Table 1, below, shows UATIUpdateTriggerTimer in a related part of a SectorParameters message. The UATIUpdateTriggerTimer is underlined.

TABLE 1

| Field | Length (bits) |
|---|---|
| MessageID | 8 |
| ... | |
| SecondaryColorCodeIncluded | 0 or 1 |
| SecondaryColorCodeCount | 0 or 3 |
| UATIUpdateTriggerTimer | 0 or 12 |

Zero or SecondaryColorCodeCount occurrences of the following field:

| | |
|---|---|
| SecondaryColorCode | 8 |
| ... | |

If SecondaryColorCodeIncluded equals "0", the AN will not define a value for the UATIUpdateTriggerTimer field. However, if the SecondaryColorCodeIncluded is not "0", the AN may define a value for the UATIUpdateTriggerTimer, with seconds as the unit.

The AN may set up the value for the UATIUpdateTriggerTimer in a SectorParameters message according to current network payload, and a default value may be 1800. The value of UATIUpdateTriggerTimer may be increased accordingly as network payload increases, and vice versa.

The AN may also send a value of time to AT (100). AT (100) may determine the length for the UATI update timer using the difference between the time received and it's current time. For example, AT (100) receives a value of time: 11:05 am, and the current time of AT (100) is 11:02 am, then the length of the UATI update timer is 180 seconds.

If, before the UATI update timer expires, AT (100) moves back to Source Subnet (102), the UATI update timer is stopped. However, if AT (100) moves to another subnet, and if no UATI update is required based on the SecondaryColorCode of the another subnet, then the UATI update timer is reset by the value of UATIUpdateTriggerTimer in a SectorParameters message of the new access subnet, and initiated.

After UATI update timer expires, AT (100) sends a UATI update request for updating UATI to Target Subnet (104). The target AN then re-assigns a UATI responsive to the UATI update request, and retrieves session information of AT (100) from Source Subnet (102). The AT session information will now be stored in Target Subnet (104), and Source Subnet (102) will not keep the session information any more. Once AT (100) gets connected in Target Subnet (104), or gets UATI updated, AT (100) stops the UATI update timer.

In reference to one embodiment depicted in FIG. 2, an AT (200) in a dormant state moves to an adjacent Target Subnet (204), and updates UATI in Target Subnet (204). Initially, AT (200), in the serving area of a Source Subnet (202), receives sector parameters sent by the Source Subnet (202)—including ColorCode with a value of 7, SecondaryColorCode with values of 8 and 9, and UATIUpdateTriggerTimer T1.

AT (200) then requests a Packet Control Function (PCF) entity (206) to register for a session in Source Subnet (202), and is assigned a UATI. After successful registration, AT (200) stores the ColorCode for Source Subnet (202) with a value of 7, and transforms to a dormant packet data session state.

As AT (200) moves to Target Subnet (204) in a dormant state, it receives sector parameters sent by Target Subnet (204)—which include ColorCode with a value of 8, SecondaryColorCode with a value of 7, and UATIUpdateTriggerTimer with a value of T2. AT (200) determines that ColorCode stored in AT (200) has a value that is included in SecondaryColorCode of Target Subnet (204) (i.e., 7), and the ColorCode stored does not equal ColorCode of Target Subnet (204), then AT (200) initiates a UATI update timer with length T2.

When the UATI update timer expires, AT (200) stops the UATI update timer, and requests a UATI update in Target Subnet (204). Target Subnet (204) then re-assigns a UATI to AT (200). AT (200) then re-stores the ColorCode with a value of 8, i.e. the value of ColorCode of Target Subnet (204), after a successful UATI update.

Another embodiment is illustrated now with reference to FIG. 3. AT (300) in a dormant state moves across a number of adjacent subnets, and updates UATI in a target subnet. First, AT (300), in the serving area of a Source Subnet (302), receives sector parameters sent by Source Subnet (302), including ColorCode with a value of 7, SecondaryColorCode with a value of 8, and UATIUpdateTriggerTimer T1.

AT (300) requests a PCF (308) to register for a session in Source Subnet (302), and is assigned a UATI. ColorCode is 7. After a successful registration, AT (300) stores the ColorCode for Source Subnet (302) with a value of 7, and transforms to a dormant packet data session state.

As AT (300) moves to a Target Subnet 1 (304) in a dormant state, it receives sector parameters sent by Target Subnet 1 (304), which include ColorCode with a value of 8, SecondaryColorCode with values of 7 and 9, and UATIUpdateTriggerTimer with a value of T2. AT (300) determines that ColorCode of AT (300) already stored has a value that is included in SecondaryColorCode of Target Subnet 1 (304) (i.e., 7), and that Target Subnet 1 (304) ColorCode is not 7. AT (300) then initiates a UATI update timer with length of T2.

Before the UATI update timer expires, AT (300) moves into a Target Subnet 2 (306) in a dormant state. AT (300) receives sector parameters sent by Target Subnet 2 (306), including ColorCode with a value of 9, SecondaryColorCode with values of 7 and 8, and UATIUpdateTriggerTimer with a value of T3. AT (300) determines that ColorCode of AT (300) already stored has a value that is included in SecondaryColorCode of Target Subnet 2 (306), i.e., 7, and Target Subnet 2 (306) ColorCode is not 7. Then, AT (300) resets the UATI update Timer to T3 and initiates the UATI update timer.

If the UATI update timer expires, AT (300) stops the UATI update timer, and requests a UATI update in Target Subnet 2 (306). Target Subnet 2 (306) re-assigns a UATI to AT (300). AT (300) then stores the ColorCode with a value of 9 after a successful UATI update.

Another embodiment is illustrated now in relation to FIG. 4. An AT (400) in a dormant state moves across to an adjacent Target Subnet (404) from a Source Subnet (402) for a short time period, and returns back to Source Subnet (402). However, AT (400) does not update UATI. The process begins when AT (400) in the serving area of Source Subnet (402), receives sector parameters sent by Source Subnet (402), including ColorCode with a value of 7, SecondaryColorCode with values of 8 and 9, and UATIUpdateTriggerTimer T1.

AT (400) requests a PCF (406) to register for a session in Source Subnet (402), and is assigned a UATI. The ColorCode is 7. After a successful registration, AT (400) stores the ColorCode for its source subnet with a value of 7, and transforms to a dormant packet data session state.

AT (400) moves across to Target Subnet (404) in a dormant state, and receives Sector Parameters sent by Target Subnet (404), which include ColorCode with a value of 8, SecondaryColorCode with a value of 7, and UATIUpdateTriggerTimer with a value of T2. AT (400) determines that ColorCode of AT (400) already stored has a value that is included in SecondaryColorCode of Target Subnet (404) (i.e., 7), and determines Target Subnet (404) ColorCode is not 7. Then, AT (400) initiates a UATI update timer with length of T2.

Before the UATI update timer expires, AT (400) returns back to Source Subnet (402), and receives sector parameters sent by Source Subnet (402), including ColorCode with a value of 7, SecondaryColorCode with values of 8 and 9, and UATIUpdateTriggerTimer with a value of T1. Since ColorCode already stored by AT (400) has the same value as the ColorCode of Source Subnet (402) just received (i.e., 7), AT (400) stops UATI update timer. However, the AT (400) will not initiate another UATI update timer.

The present invention thus provides signaling between ATs and Access Networks (ANs) that optimizes access performance of the ATs—particularly by reducing communication between subnets. A UATI update may be triggered after an AT moves into a target subnet, from a source subnet. Forward signaling reaches an AT, access delay of the AT is reduced, and wireless communication performance is improved. This ensures that the AT receives forward signaling, shortens call set-up delay.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communication for an access terminal, in a wireless network having a plurality of subnets, the method comprising:
    determining, by the access terminal, as the access terminal in a dormant state moves from a source subnet to a target subnet, whether a ColorCode associated with the source subnet corresponds to a SecondaryColorCode of the target subnet;
    initiating, by the access terminal, a Unicast Access Terminal Identifier (UATI) update request from the access terminal to the target subnet if the ColorCode associated with the source subnet does not correspond to the SecondaryColorCode of the target subnet; and
    providing, by the access terminal, a method to delay the Unicast Access Terminal Identifier (UATI) update if the ColorCode associated with the source subnet corresponds to the SecondaryColorCode of the target subnet, wherein providing a method to delay the UATI update further comprises:
    initiating a Unicast Access Terminal Identifier (UATI) update timer; and
    initiating a Unicast Access Terminal Identifier (UATI) update request from the access terminal to the target subnet if the Unicast Access Terminal Identifier (UATI) update timer expires.

2. The method of claim 1 further comprising defining the Unicast Access Terminal Identifier (UATI) update timer utilizing information sent by the target subnet.

3. The method of claim 2 wherein the information comprises a value of UATIUpdateTriggerTimer in a SectorParameters message sent by the target subnet.

4. The method of claim 3 wherein the value of UATIUpdateTriggerTimer is defined responsive to network payload.

5. The method of claim 3 wherein a default value of the UATIUpdateTriggerTimer is 1800 seconds.

6. The method of claim 2 wherein the information comprises a value of time sent by the target subnet, and the UATI update timer is defined using the time sent by the target subnet and the current time of the access terminal.

7. The method of claim 1 further comprising stopping the Unicast Access Terminal Identifier (UATI) update timer if the access terminal moves back to the source subnet before the Unicast Access Terminal Identifier (UATI) update timer expires, wherein the access terminal does not initiate a Unicast Access Terminal Identifier (UATI) update request to the target subnet.

8. The method of claim 1 further comprising resetting and initiating the Unicast Access Terminal Identifier (UATI) update timer if the access terminal moves to a second target subnet before the Unicast Access Terminal Identifier (UATI) update timer expires.

9. The method of claim 8 wherein the Unicast Access Terminal Identifier (UATI) update timer is reset using information sent by the second target subnet.

10. A wireless communications system, comprising:
    a plurality of subnets; and
    at least one access terminal;
    wherein the at least one access terminal is adapted to store ColorCode value of a source subnet within which it is residing;
    wherein, the at least one access terminal, when moving from the source subnet to a target subnet in a dormant state, is adapted to determine whether a ColorCode associated with the source subnet corresponds to a SecondaryColorCode of the target subnet;
    wherein the at least one access terminal is adapted to initiate a Unicast Access Terminal Identifier (UATI) update request to the target subnet if the ColorCode associated with the source subnet does not correspond to the SecondaryColorCode of the target subnet; and
    wherein the at least one access terminal is adapted to provide at least one method to delay the Unicast Access Terminal Identifier (UATI) update in the target subnet if the ColorCode associated with the source subnet does correspond to the SecondaryColorCode of the target subnet, and wherein the at least one method to delay the Unicast Access Terminal Identifier (UATI) update comprises:
    initiating a Unicast Access Terminal Identifier (UATI) update timer; and initiating a Unicast Access Terminal Identifier (UATI) update request to the target subnet if the Unicast Access Terminal Identifier (UATI) update timer expires.

11. The system of claim 10 wherein the Unicast Access Terminal Identifier (UATI) update timer is defined utilizing information sent by the target subnet.

12. The system of claim 11 wherein the information comprises a value of UATIUpdateTriggerTimer in a SectorParameters message sent by the target subnet.

13. The system of claim 12 wherein the value of UATIUpdateTriggerTimer is defined responsive to network payload.

14. The system of claim 12 wherein a default value of the UATIUpdateTriggerTimer is 1800 seconds.

15. The system of claim 11 wherein the information comprises a value of time sent by the target subnet, and the UATI update timer is defined using the time sent by the target subnet and the current time of the at least one access terminal.

16. The system of claim 10 wherein the at least one access terminal is adapted to stop the Unicast Access Terminal Identifier (UATI) update timer if the at least one access terminal moves back to the source subnet before the Unicast Access Terminal Identifier (UATI) update timer expires, wherein the at least one access terminal does not initiate a Unicast Access Terminal Identifier (UATI) update request to the target subnet.

17. The system of claim 10 wherein the at least one access terminal is adapted to reset and initiate the Unicast Access Terminal Identifier (UATI) update timer if the at least one access terminal moves to a second target subnet before the Unicast Access Terminal Identifier (UATI) update timer expires.

18. A method of updating Unicast Access Terminal Identifier (UATI) of an access terminal in a dormant state, in a wireless network having a plurality of subnets, the method comprising:
- determining, by the access terminal, as the access terminal in a dormant state moves from a source subnet to a target subnet, whether a ColorCode associated with the source subnet corresponds to a SecondaryColorCode of the target subnet;
- initiating, by the access terminal, a Unicast Access Terminal Identifier (UATI) update request from the access terminal to the target subnet if the ColorCode associated with the source subnet does not correspond to the SecondaryColorCode of the target subnet;
- initiating, by the access terminal, a Unicast Access Terminal Identifier (UATI) update timer if the ColorCode associated with the source subnet corresponds to the SecondaryColorCode of the target subnet;
- wherein a Unicast Access Terminal Identifier (UATI) update request is initiated from the access terminal to the target subnet when the Unicast Access Terminal Identifier (UATI) update timer expires;
- wherein the Unicast Access Terminal Identifier (UATI) update timer is stopped if the at least one access terminal moves back to the source subnet before the Unicast Access Terminal Identifier (UATI) update timer expires; and
- wherein the Unicast Access Terminal Identifier (UATI) update timer is reset and initiated if the at least one access terminal moves to a second target subnet before the Unicast Access Terminal Identifier (UATI) update timer expires.

* * * * *